(12) United States Patent
Kato

(10) Patent No.: US 6,687,604 B2
(45) Date of Patent: Feb. 3, 2004

(54) APPARATUS PROVIDING AUDIO MANIPULATION PHRASE CORRESPONDING TO INPUT MANIPULATION

(75) Inventor: Masayuki Kato, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/921,597

(22) Filed: Aug. 6, 2001

(65) Prior Publication Data

US 2002/0026279 A1 Feb. 28, 2002

(30) Foreign Application Priority Data

Aug. 14, 2000 (JP) ........................................ 2000-245864

(51) Int. Cl.$^7$ .............................................. G01C 21/00
(52) U.S. Cl. ..................................................... 701/200
(58) Field of Search ......................... 701/36, 200–201; 340/825.19, 825.22, 825.24, 5.3, 5.31–5.32; 345/704–716, 727–729, 742–743, 810–812, 825, 861, 828–829, 865; 704/246, 251, 257, 271; 379/52

(56) References Cited

U.S. PATENT DOCUMENTS

| | | | | |
|---|---|---|---|---|
| 5,386,494 A | * | 1/1995 | White | 704/231 |
| 5,832,439 A | * | 11/1998 | Cox et al. | 704/254 |
| 6,088,731 A | * | 7/2000 | Kiraly et al. | 709/202 |
| 6,324,507 B1 | * | 11/2001 | Lewis et al. | 379/88.01 |

FOREIGN PATENT DOCUMENTS

| | | | | |
|---|---|---|---|---|
| JP | 5-99679 | * | 4/1993 | G01C/21/00 |
| TP | 18602 A | * | 1/1986 | G06F/00/01 |

* cited by examiner

*Primary Examiner*—Thu Nguyen
(74) *Attorney, Agent, or Firm*—Morgan, Lewis & Bockius LLP

(57) ABSTRACT

An in-vehicle navigation system is capable of reducing a burden on the user for utilizing an audio manipulation function. In response to a manual input manipulation, the navigation system audibly or visually presents an audio manipulation phrase which is used when the manipulation is performed through an audio manipulation.

9 Claims, 7 Drawing Sheets

FIG. 2

| KEY INPUT MANIPULATION | MANIPULATION CODE | AUDIO MANIPULATION PHRASE (DATA) |
|---|---|---|
| [SKY VIEW KEY] | SKYV | "SKY VIEW" OR "SET TO SKY VIEW" |
| [ENLARGE KEY] | WIDE | "ENLARGEMENT" OR "ENLARGE" |
| [HOME KEY] | HOME | "HOME" OR "SET TO HOME" |
| [DESTINATION KEY] | TERG | "DESTINATION" OR "FIND DESTINATION" |
| [MENU KEY] | MENU | "MENU" OR "OPEN MENU" |
| [NORTH UPSIDE KEY] | KITA | "NORTH UPSIDE" OR "SET NORTH UPSIDE" |

FIG. 3

| KEY INPUT MANIPULATION | MANIPULATION CODE | AUDIO MANIPULATION PHRASE (DATA) |
|---|---|---|
| [SKY VIEW KEY]⇨[ENLARGE KEY] | "SKYV"⇨"WIDE" | "ENLARGE AND SKYVIEW" OR "ENLARGE AND DISPLAY SKYVIEW" |
| [HOME KEY]⇨[DESTINATION KEY] ⇨[MENU KEY] | "HOME"⇨"TERG"⇨"MENU" | "GO HOME" OR "SET HOME AS DESTINATION" |

APPARATUS PROVIDING AUDIO MANIPULATION PHRASE CORRESPONDING TO INPUT MANIPULATION

BACKGROUND OF THE INVENTION

1. Field of the Invention

The present invention relates to an in-vehicle navigation system for displaying a current position of a vehicle, and more particularly, to an in-vehicle navigation system which comprises an audio manipulating function.

2. Description of Related Art

An in-vehicle navigation system which utilizes GPS (Global Positioning System) satellites or the like to detect a current position of a vehicle and display the current position on a display has been commercially available.

In addition, an in-vehicle navigation system having an audio manipulating function has been recently introduced for enabling a user to perform a variety of manipulations through the user's voice. Such an in-vehicle navigation system has been previously registered with audio manipulation phrases corresponding to a variety of manipulations for use in implementing the manipulations, for example, "ENLARGE MAP" or "CHANGE ROUTE". Then, as the user speaks one of the registered audio manipulation phrases as it is, the in-vehicle navigation system searches for a manipulation corresponding to the audio manipulation phrase from the registered contents to perform the manipulation.

However, since the in-vehicle navigation system is provided with a large number of manipulation items, the user must have learnt all of registered audio manipulation phrases before he utilizes the audio manipulating function.

OBJECT AND SUMMARY OF THE INVENTION

The present invention has been made to solve the above problem, and an object of the present invention is to provide an in-vehicle navigation system which is capable of reducing a burden on the user for utilizing the audio manipulating function.

An in-vehicle navigation system according to the present invention has a manipulation setting part for performing settings in accordance with a manual input manipulation or an audio input manipulation. The in-vehicle navigation system includes an audio manipulation information generator responsive to the manual input manipulation for generating audio manipulation phrase data indicative of an audio manipulation phrase for causing the same function as the manual input manipulation, and an audio manipulation phrase display unit for displaying the audio manipulation phrase indicated by the audio manipulation phrase data.

BRIEF DESCRIPTION OF THE DRAWINGS

FIG. 2 is a table showing the correspondence among each key input manipulation, a manipulation code, and an audio manipulation phrase which should be spoken for performing the key input manipulation through an audio manipulation;

FIG. 3 is a table showing the correspondence among a sequence of predetermined key input manipulations, a manipulation code, and an audio manipulation phrase which should be spoken for making a manipulation eventually resulting from the sequence of key input manipulations through the audio manipulation;

DETAILED DESCRIPTION Op THE EMBODIMENTS

In the following, embodiments of the present invention will be described in detail with reference to the accompanying drawings.

Figure 1:
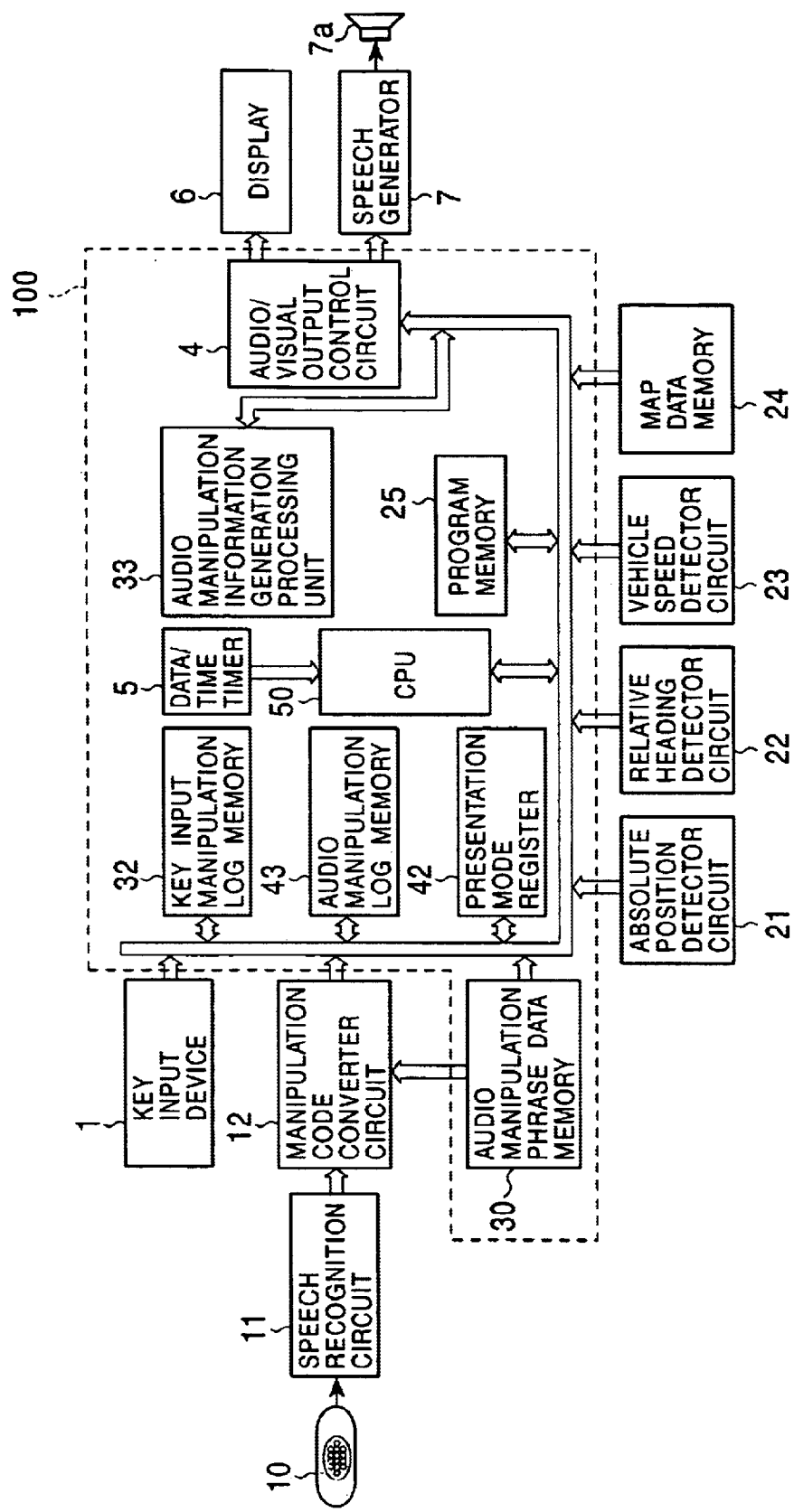
FIG. 1 is a block diagram illustrating the configuration of an in-vehicle navigation system according to the present invention.

FIG. 1 illustrates the configuration of an in-vehicle navigation system according to the present invention.

In FIG. 1, an absolute position detector circuit 21 receives electric waves from GPS (Global Positioning System) satellites, not shown, to calculate the absolute position coordinates and heading of a vehicle in which it is equipped, and supplies a controller 100 with the calculation result as vehicle position information. A relative heading detector circuit 22 detects a heading indicative of a direction in which the vehicle is currently traveling, i.e., a so-called relative heading, for example, using a gyro or the like, and supplies the controller 100 with relative heading information indicative of the relative heading. A vehicle speed detector circuit 23 detect a current traveling speed of the vehicle, and supplies the controller 100 with speed information indicative of the traveling speed. A map data memory device 24 comprises an information reproducing apparatus for reproducing map data, for example, from CD-ROM or DVD (Digital Versatile Disc) on which map data is stored for each of regions, and supplies the controller 100 with the reproduced map data.

A key input manipulating device 1, which is a manual input manipulation part for accepting manual manipulations from the user, generates manipulation codes corresponding to a variety of key input manipulations, for example, as shown in FIG. 2, and supplies the controller 100 with the generated manipulation codes.

A microphone 10, a speech recognition circuit 11, and a manipulation code converter circuit 12 comprise an audio input manipulating part for accepting an audio manipulation from the user. First, the microphone 10 converts a voice spoken by the user into an audio signal which is supplied to the speech recognition circuit 11. The speech recognition circuit 11 comprises recognition dictionary data for each phrase which is comprised of a parameter representative of its characteristics and waveform data. The speech recognition circuit 11 conducts pattern matching for the audio signal based on the recognition dictionary data to recognize a phrase spoken by the user. Then, the speech recognition circuit 11 supplies the manipulation code converter circuit 12 with phrase data corresponding to the recognized phrase. The manipulation code converter circuit 12 fetches the phrase data sequentially supplied thereto from the speech recognition circuit 11, and searches an audio manipulation phrase data memory 30 built in the controller 100 for audio manipulation data indicative of the same phrase as this phrase data. Then, the manipulation code converter circuit 12 reads a manipulation code corresponding to the searched audio manipulation phrase from the audio manipulation phrase data memory 30 and supplies the manipulation code to the controller 100. The audio manipulation phrase data memory 30 includes a first memory region and a second memory region. As shown in FIG. 2, the first memory region previously stores each key input manipulation and audio manipulation phrase data corresponding to an audio manipulation phrase, which causes the same function, associated with the manipulation code. On the other hand, as shown in FIG. 3, the second memory region previously stores a manipulation eventually accomplished by a sequence of key input manipulations and audio manipulation phrase data corresponding to an audio manipulation phrase, which causes the same function.

A CPU (Central Processing Unit) 50 included in the controller 100 performs navigation control for displaying a map with a current vehicle position mark added thereto on a screen of the display 6 in accordance with a program previously stored in a program memory 25. For example, the CPU 50 first calculates a current position of the vehicle in which it is equipped, based on information from each of the absolute position detector circuit 21, relative heading detector circuit 22 and vehicle speed detector circuit 23. Next, the CPU 50 reads map data including the current position of the vehicle from map data of each regional segment stored in the map data memory 24. Then, the CPU 50 supplies the audio/visual output control circuit 4 with display map data on which a vehicle position mark indicative of the current position of the vehicle is superimposed on a map represented by the map data. The audio/visual output control circuit 4 generates an image signal for displaying this display map data, and supplies the image signal to the display 6. In this way, the display 6 displays in accordance with the image signal, i.e., displays the map superimposed with the vehicle position mark. Further, in the mean time, the CPU 50 controls the audio/visual output control circuit 4 for audibly outputting a variety of audio announces through a speech generator 7 and a speaker 7a.

The CPU 50 also makes a variety of settings for the in-vehicle navigation system in response to audio manipulations performed through key input manipulations using the key input manipulating device 1 or through the microphone 10. In this event, as a key input manipulation is performed, the CPU 50 controls to display and audibly present an audio manipulation phrase which should be spoken when the key input manipulation is performed through an audio manipulation.

Figure 4:
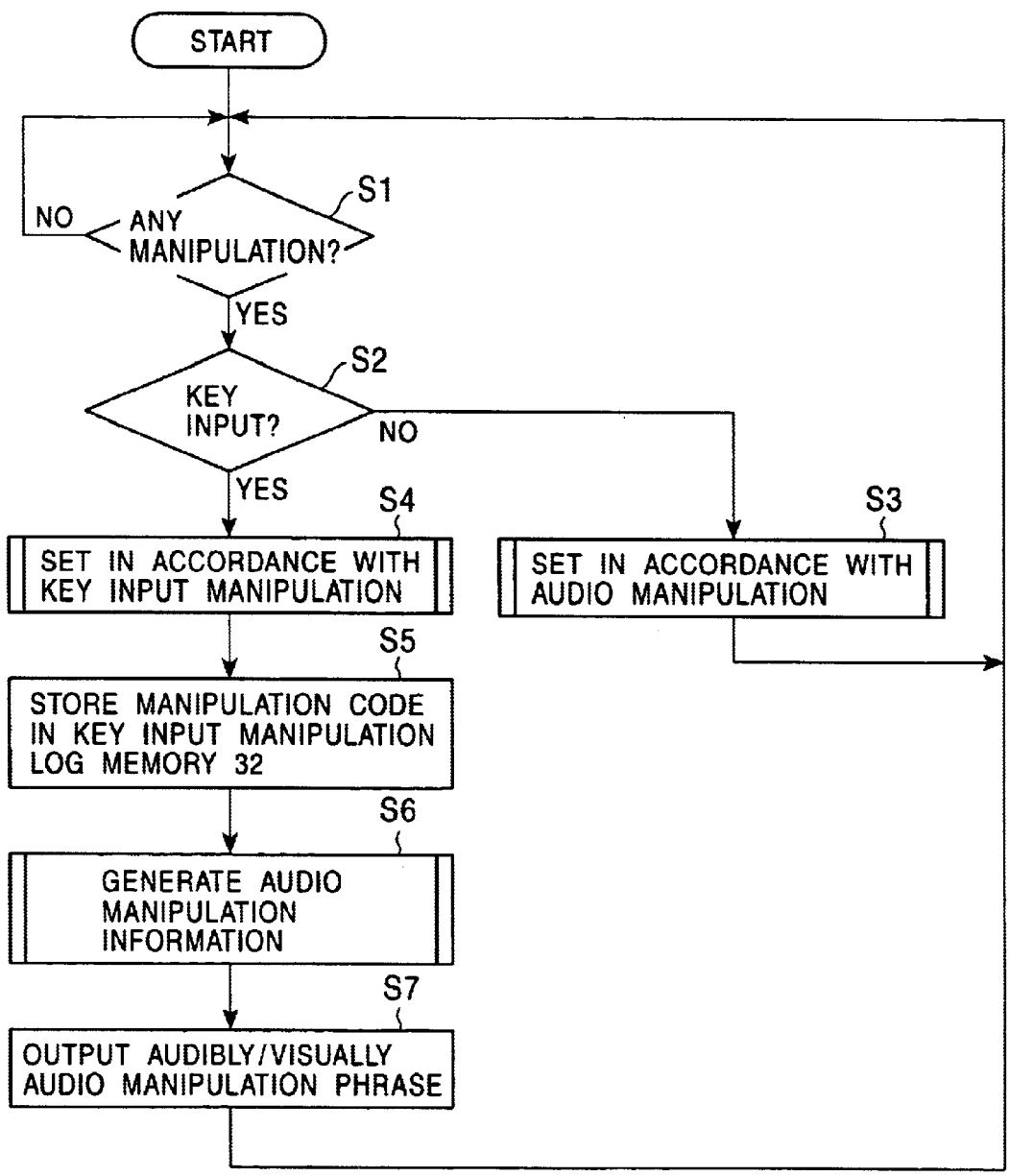
FIG. 4 is a flow chart illustrating an example of a manipulation execution flow according to the present invention.

FIG. 4 is a diagram illustrating a manipulation execution flow performed by the CPU 50 when it accepts a key input manipulation or an audio manipulation by the user and performs processing corresponding to the manipulation.

First, in FIG. 4, the CPU 50 repeatedly determines whether or not the user has performed a key input manipulation or an audio manipulation until either of these manipulations is performed (step S1). When determining at step S1 that the key input manipulation or audio manipulation has been performed, the CPU 50 determines whether or not the manipulation is a key input manipulation (step S2). When determining at step S2 that the manipulation is not a key input manipulation (i.e., it is an audio manipulation), the CPU 50 performs settings in accordance with the manipulation code supplied from the manipulation code converter circuit 12 by this audio manipulation (step S3). For example, when a manipulation code (WIDE) as shown in FIG. 2 is supplied in response to a manipulation word "enlarge" from the user, the CPU 50 reads from the map data memory 24 map data which is enlarged in scale by one increment from the map displayed on the screen of the display 6, and supplies the map data to the audio/visual output control circuit 4. In this way, the display 6 displays on its screen an image of the map enlarged in scale by one increment with the vehicle mark added thereto.

On the other hand, when determining at step S2 that the manipulation is a key input manipulation, the CPU 50 performs settings in accordance with the manipulation code supplied from the key input device 1 by this key input manipulation (step S4). For example, when a manipulation code "KITA" is supplied in response to a "north upside key" manipulation of the user, as shown in FIG. 2, the CPU 50 reads from the map data memory 24 map data which represents the map displayed on the screen of the display 6 oriented such that the "north" is on the upper side, and supplies the map data to the audio/visual output control circuit 4. In this way, the display 6 displays on its screen an image of a map, on which "north" is on the upper side, with the vehicle mark added thereto.

After completion of step S4, the CPU 50 stores the manipulation code corresponding to the key input manipulation as described above in a key input manipulation log memory 32 (step S5).

Next, the CPU 50 performs a processing operation by the audio manipulation information generation processing unit 33 (step S6). Specifically, the CPU 50 first reads the most recent manipulation code and each of manipulation codes stored preceding thereto from the key input manipulation log memory 32. Next, the CPU 50 determines whether or not a combination of the most recent manipulation code and each of the preceding manipulation codes exists in the second memory region of the audio manipulation phrase data memory 30 as shown in FIG. 3. When determining here that the combination exists, the CPU 50 searches for audio manipulation phrase data corresponding to the combination of manipulation codes from the second memory region of the audio manipulation phrase data memory 30 as shown in FIG. 3 and reads the audio manipulation phrase data. On the other hand, when determining that the combination of the most recent manipulation code and each of the preceding manipulation codes does not exist in the second memory region of the audio manipulation phrase data memory 30, the CPU 50 searches for audio manipulation phrase data corresponding to the most recent manipulation code from the first memory region of the audio manipulation phrase data memory 30 as shown in FIG. 2, and reads the audio manipulation phrase data.

Figure 5:
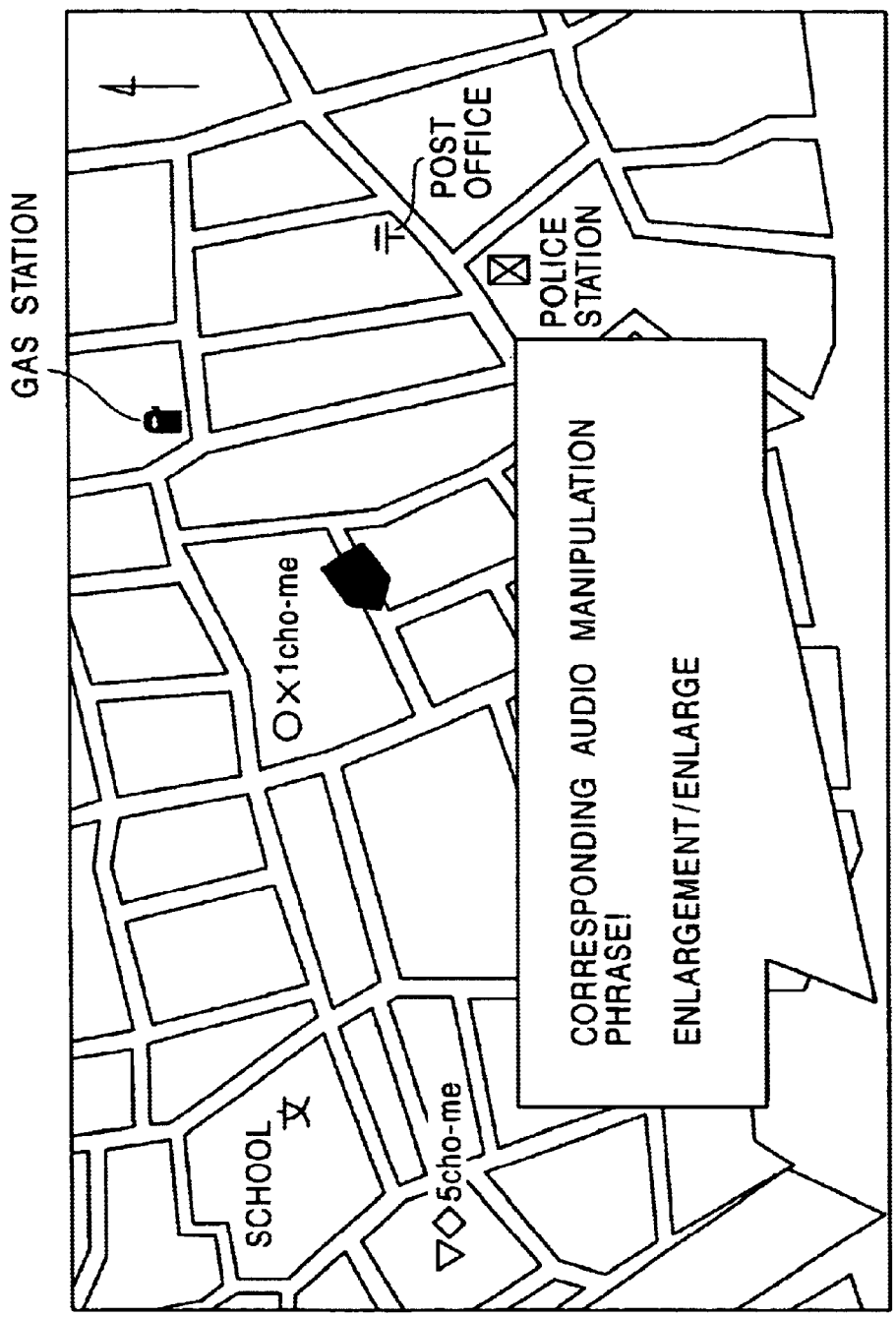
FIG. 5 is a diagram illustrating an exemplary display when an audio manipulation phrase is displayed.

After execution of step S6, the CPU 50 supplies the audio/visual output control circuit 4 with an audio manipulation phrase indicated by the audio manipulation phrase data read at step S6 for visual and audible outputs (step S7). The audio/visual output control circuit 4 converts the audio manipulation phrase data to character information indicative of its contents, and generates an image signal corresponding to an image which is superimposed with the character information on the currently displayed map illustrated in FIG. 5, and supplies the display 6 with the image signal. Further, the CPU 50 supplies the speech generator 7 with audio phrase data "present manipulation" and subsequently supplies the speech generator 7 with the audio manipulation phrase data and audio phrase data "can be made with a word(s) . . . " Therefore, when the user has performed, for example, a "home key" manipulation, a speech:

"present manipulation can be made with a word(s) 'home' or 'select home'" is audibly output from the speaker 7a connected to the speech generator 7.

After the execution of step S3 or S7, the CPU 50 returns to the execution of step S1 to repeatedly execute the operations as described above.

Specifically, as the user performs a desired key input manipulation (shown in FIG. 2) using the key input device 1, the CPU 50 first performs settings in accordance with the manipulation (step S4). Then, the CPU 50 searches for an audio manipulation phrase which is used when this key input manipulation is performed through an audio manipulation from the audio manipulation phrase data memory 30, and presents this to the user through display or speech (steps S6, S7).

As described above, each time the user performs a key input manipulation, an audio manipulation phrase corresponding to this key input manipulation is displayed or audibly presented to the user, so that the user can utilize the audio manipulation function from the next time by speaking this presented audio manipulation phrase.

Further, when a sequence of predetermined key input manipulations, for example:

[home key]->[destination key]->[menu key]

is performed as shown in FIG. 3, an audio manipulation phrase indicative of the contents of a manipulation eventually accomplished by the three sequential input manipulations:

"A sequence of present manipulation can be manipulated through a speech 'go home'" is displayed or audibly presented.

Therefore, the user can perform the manipulation eventually accomplished by the sequence of key input manipulations as mentioned above only by speaking this audio manipulation phrase.

While in the foregoing embodiment, an audio manipulation phrase is always presented each time a key input manipulation is performed, the user may feel annoyed if audio manipulation phrases known to the user is frequently presented. To eliminate this inconvenience, the audio manipulation phrase may be presented only when the user requests for the presentation of the audio manipulation phrase. In this event, the CPU 50 uses the manipulation execution flow illustrated in FIG. 6 instead of that illustrated in FIG. 4.

Figure 6:
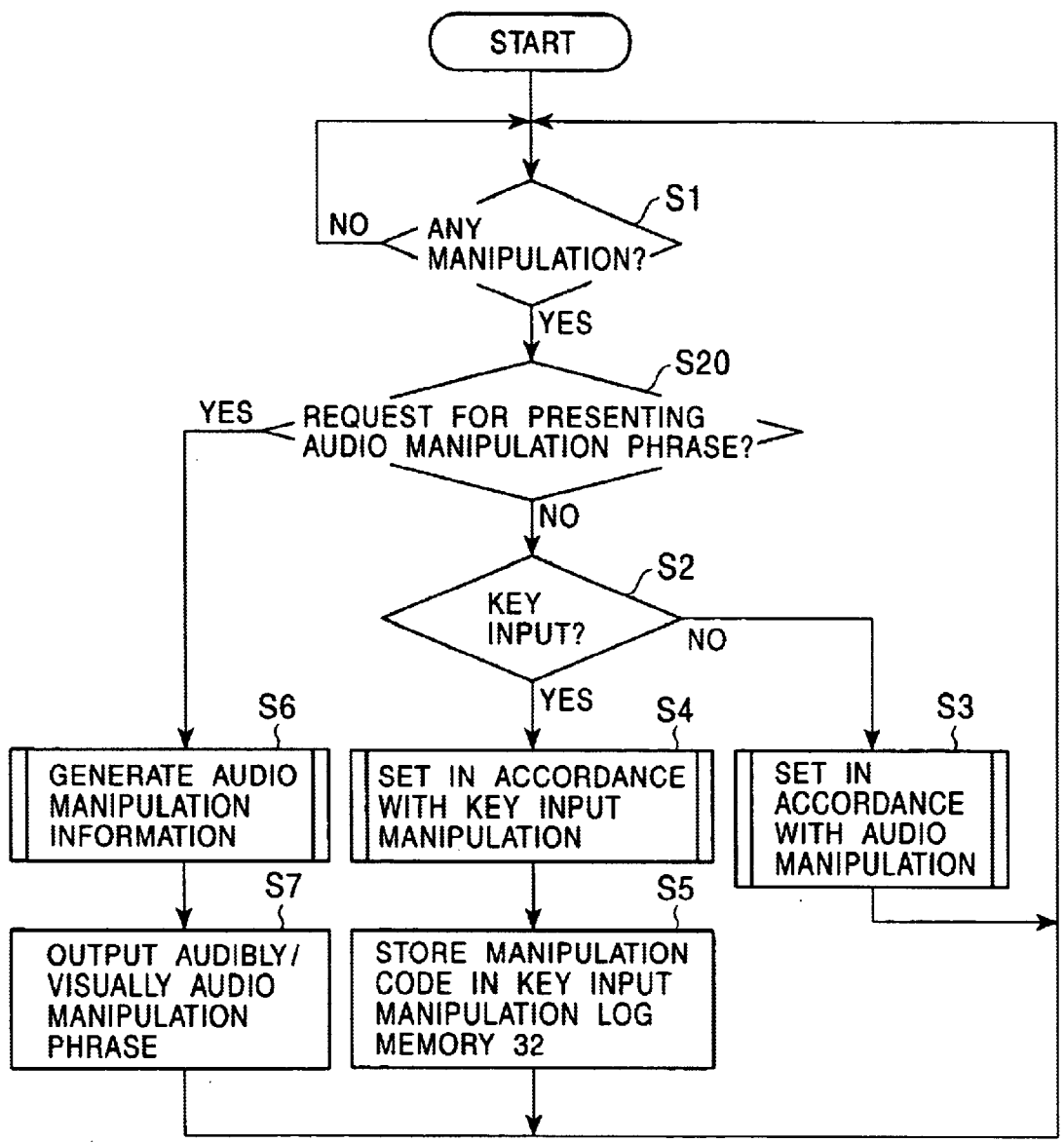
FIG. 6 is a flow chart illustrating an example of a manipulation execution flow in another embodiment of the present invention.

First, in FIG. 6, the CPU 50 repeatedly determines whether or not the user has performed a key input manipulation or an audio manipulation until either of these manipulations is performed (step S1). When determining at step S1 that the key input manipulation or audio manipulation has been performed, the CPU 50 next determines whether or not the manipulation is a request for presenting an audio manipulation phrase (step S20). When determining at step S20 that the manipulation is not a request for presenting an audio manipulation phrase, the CPU 50 determines whether or not the manipulation is a key input manipulation (step S2). When determining at step S2 that the manipulation is not a key input manipulation (i.e., it is an audio manipulation), the CPU 50 performs settings in accordance with the manipulation code supplied from the manipulation code converter circuit 12 by this audio manipulation (step S3). On the other hand, when determining at step S2 that the manipulation is a key input manipulation, the CPU 50 performs settings in accordance with the manipulation code supplied from the key input device 1 by this key input manipulation (step S4). After completion of step S4, the CPU 50 stores the manipulation code corresponding to the key input manipulation as described above in the key input manipulation log memory 32 (step S5).

On the other hand, when determining at step S20 that the user has performed a manipulation for a request for presenting an audio manipulation phrase, the CPU 50 performs a processing operation by the audio manipulation information generation processing unit 33-(step S6). Specifically, the CPU 50 first reads the most recent manipulation code and each of manipulation codes stored preceding thereto from the key input manipulation log memory 32. Next, the CPU 50 determines whether or not a combination of the most recent manipulation code and each of the preceding manipulation codes exists in the second memory region of the audio manipulation phrase data memory 30 as shown in FIG. 3. When determining here that the combination exists, the CPU 50 reads audio manipulation phrase data corresponding to the combination of manipulation codes from the second memory region of the audio manipulation phrase data memory 30 as shown in FIG. 3. On the other hand, when determining that the combination of the most recent manipulation code and each of the preceding manipulation codes does not exist in the second memory region of the audio manipulation phrase data memory 30, the CPU 50 reads audio manipulation phrase data corresponding to the most recent manipulation code from the first memory region of the audio manipulation phrase data memory 30 as shown in FIG. 2. After the execution of step S6, the CPU 50 supplies the audio/visual output control circuit 4 with an audio manipulation phrase indicated by the audio manipulation phrase data read at step S6 for visual and audible outputs (step S7).

After the execution of step S3, S5 or S7, the CPU 50 returns to the execution of step S1 to repeatedly execute the operations as described above.

Specifically, steps S6 and S7 are executed only when the user performs a manipulation for a request for presenting an audio manipulation phrase, so that an audio manipulation phrase is presented corresponding to a key input manipulation performed by the user immediately before the manipulation for the presentation request. In other words, the audio manipulation phrase is presented only when the user requires it.

In this event, the user may be allowed to set conditions for presenting an audio manipulation phrase.

For example, the following three presentation modes 1–3 may be previously provided:

Presentation Mode 1: Presents an audio manipulation phrase at all times;

Presentation Mode 2: Presents an audio manipulation phrase only when a sequence of predetermined key input manipulations is performed; and Presentation Mode 3: Does not present an audio manipulation phrase.

such that the user may specify an arbitrary mode from them.

Figure 7:
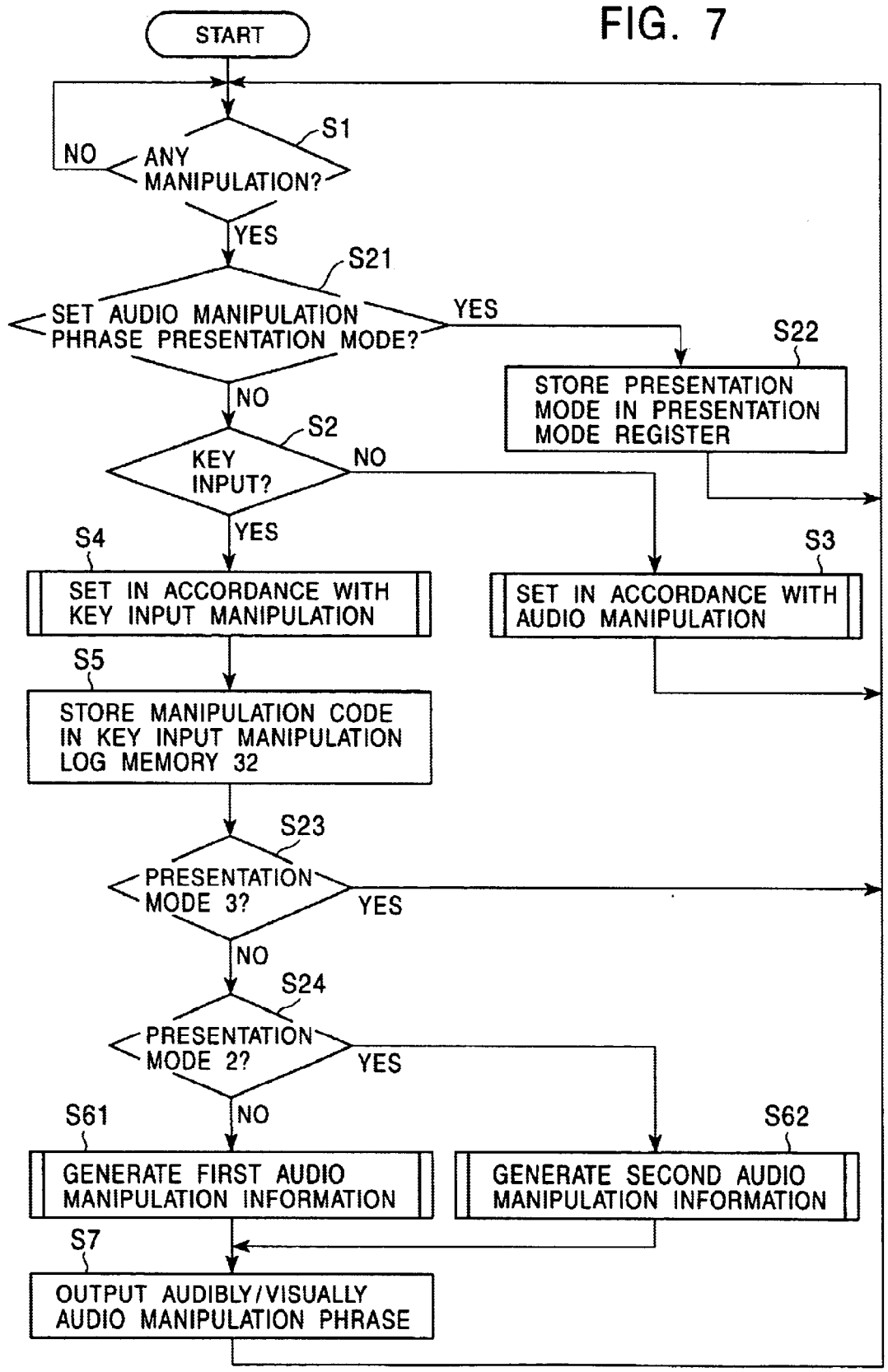
FIG. 7 is a flow chart illustrating an example of a manipulation execution flow in another embodiment of the present invention.

FIG. 7 is a diagram illustrating another embodiment of the manipulation execution flow which is employed when one of the presentation modes 1–3 is specified and an audio manipulation phrase is presented in accordance with a specified presentation mode.

First, in FIG. 7, the CPU 50 repeatedly determines whether or not the user has performed a key input manipulation or an audio manipulation until either of these manipulations is performed (step S1). When determining at step S1 that the key input manipulation or audio manipulation has been performed, the CPU 50 next determines whether or not the manipulation is a manipulation for setting a presentation mode for an audio manipulation phrase (step S21).

When determining at step S21 that the manipulation is a manipulation for setting a presentation mode for an audio manipulation phrase, the CPU 50 stores a presentation mode (presentation mode 1–3) specified from the user by the manipulation in a presentation mode register 42 (step S22). After execution of step S22, the CPU 50 returns to the execution of step S1. On the other hand, when determining at step S22 that the manipulation is not a manipulation for setting a presentation mode for an audio manipulation phrase, the CPU 50 determines whether or not the manipulation is a key input manipulation (step S2). When determining at step S2 that the manipulation is not a key input manipulation (i.e., it is an audio manipulation), the CPU 50 performs settings in accordance with the manipulation code supplied from the manipulation code converter circuit 12 by this audio manipulation (step S3). After execution of step S3, the CPU 50 returns to the execution of step S1.

On the other hand, when determining at step S2 that the manipulation is a key input manipulation, the CPU 50 performs settings in accordance with the manipulation code supplied from the key input device 1 by this key input manipulation (step S4). After completion of step S4, the CPU 50 stores the manipulation code corresponding to the key input manipulation as described above in the key input manipulation log memory 32 (step S5).

Next, the CPU 50 determines whether or not the presentation mode stored in the presentation mode register 42 is Presentation Mode 3 (step S23). When determining at step S23 that the stored presentation mode is not Presentation Mode 3, the CPU 50 next determines whether or not the presentation mode stored in the presentation mode register 42 is Presentation Mode 2 (step S24). When determining at step S24 that the stored presentation mode is not Presentation Mode 2, i.e., when determining that the stored presentation mode is Presentation Mode 1, the CPU 50 executes first audio manipulation information generation processing by the audio manipulation information generation processing unit 33 (step S61). Specifically, the CPU 50 first reads the most recent manipulation code and each of manipulation codes stored preceding thereto from the key input manipulation log memory 32. Next, the CPU 50 determines whether or not a combination of the most recent manipulation code and each of the preceding manipulation codes exists in the second memory region of the audio manipulation phrase data memory 30 as shown in FIG. 3. When determining here that the combination exists, the CPU 50 reads audio manipulation phrase data corresponding to the combination of manipulation codes from the second memory region of the audio manipulation phrase data memory 30 as shown in FIG. 3. On the other hand, when determining that the combination of the most recent manipulation code and each of the preceding manipulation codes does not exist in the second memory region of the audio manipulation phrase data memory 30, the CPU 50 reads audio manipulation phrase data corresponding to the most recent manipulation code from the first memory region of the audio manipulation phrase data memory 30 as shown in FIG. 2.

On the other hand, when determining at step S24 that the presentation mode stored in the presentation mode register 42 is Presentation Mode 2, the CPU 50 executes second audio manipulation information generation processing by the audio manipulation information generation processing unit 33 (step S62). Specifically, the CPU 50 first reads the most recent manipulation code and each of manipulation codes stored preceding thereto from the key input manipulation log memory 32. Next, the CPU 50 determines whether or not a combination of the most recent manipulation code and each of the preceding manipulation codes exists in the second memory region of the audio manipulation phrase data memory 30 as shown in FIG. 3. Here, only when determining here that the combination exists, the CPU 50 reads audio manipulation phrase data corresponding to the combination of manipulation codes from the second memory region of the audio manipulation phrase data memory 30 as shown in FIG. 3.

After the execution of steps 61 or 62, the CPU 50 supplies the audio/visual output control circuit 4 with an audio manipulation phrase indicated by the audio manipulation phrase data read at step S61 or S62 for visual and audible outputs (step S7).

After the execution of step S7, or when determining at step S23 that the presentation mode is Presentation Mode 3, the CPU 50 returns to the execution of step S1 to repeatedly execute the operations as described above.

Thus, according to the operation illustrated in FIG. 7, when the user specifies Presentation Mode 3, step S7 is not executed so that no audio manipulation phrase is presented. On the other hand, when the user specifies Presentation Mode 2, as long as a sequence of predetermined key input manipulations is performed, an audio manipulation phrase corresponding to a manipulation eventually accomplished by this sequence of key input manipulations is presented through the execution of steps S62 and S7. Further, when the user specifies Presentation Mode 1, audio manipulation phrases corresponding to all key input manipulations are presented through the execution of steps S61 and S7.

Also, in the operation illustrated in FIG. 6, an audio manipulation phrase is presented in response to a request from the user. Alternatively, determination may be automatically made as to whether or not an audio manipulation phrase is presented in accordance with a level at which the user has learnt an associated audio manipulation.

Figure 8:
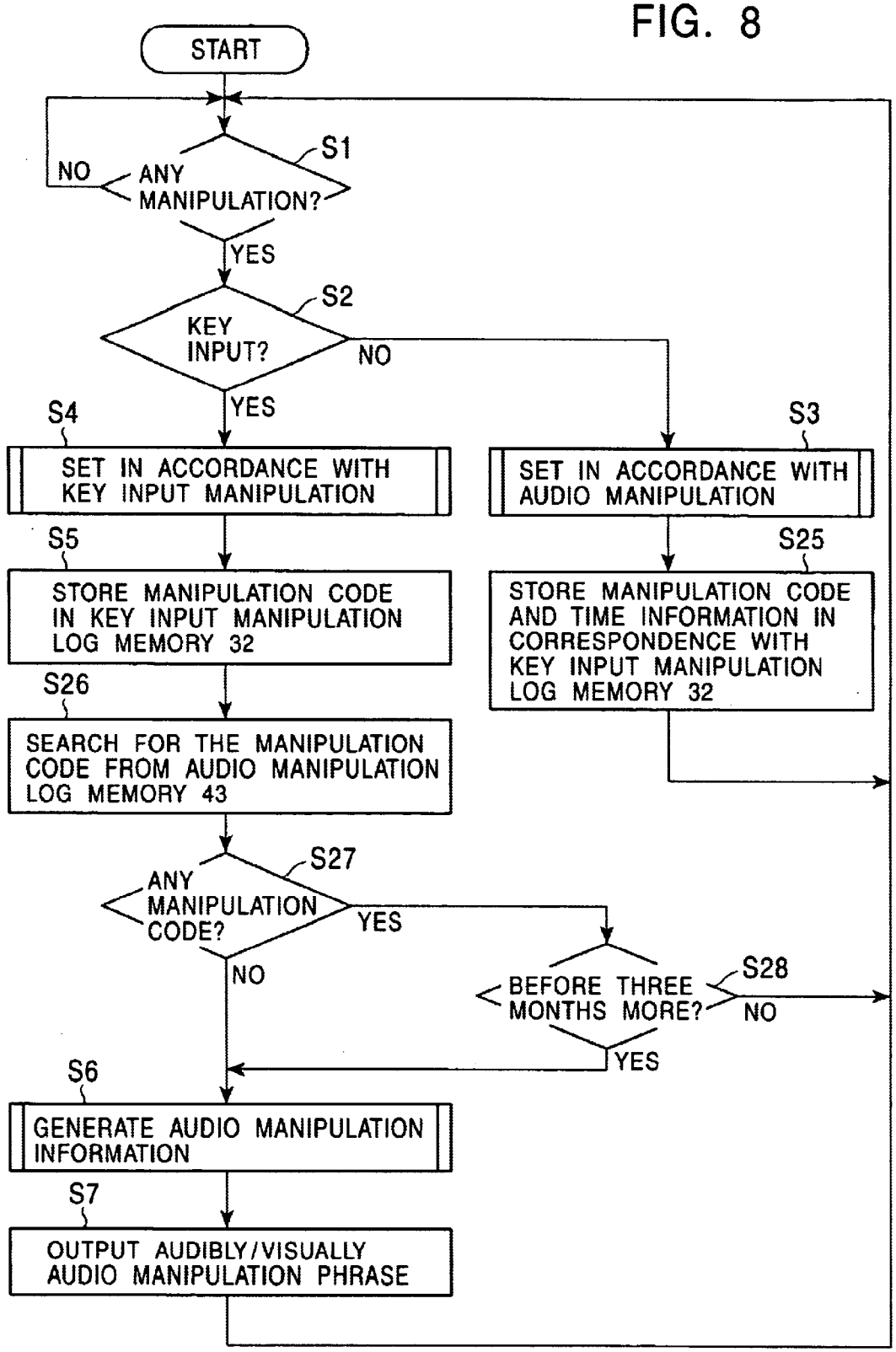
FIG. 8 is a flow chart illustrating an example of a manipulation execution flow in another embodiment of the present invention.

FIG. 8 is a diagram illustrating another embodiment of the manipulation execution flow which has been made in view of the foregoing aspect.

In FIG. 8, the CPU 50 first repeatedly determines whether or not the user has performed a key input manipulation or an audio manipulation until either of these manipulations is performed (step S1). When determining at step S1 that the key input manipulation or audio manipulation has been performed, the CPU 50 determines whether or not the manipulation is a key input manipulation (step S2). When determining at step S2 that the manipulation is not a key input manipulation (i.e., it is an audio manipulation), the CPU 50 performs settings in accordance with the manipulation code supplied from the manipulation code converter circuit 12 by this audio manipulation (step S3). After the termination of step S3, the CPU 50 stores date/time information indicative of date and time measured by a date/time timer 5 and the manipulation code resulting from the audio manipulation in an audio manipulation log memory 43 in correspondence (step S25), and returns to the execution of step S1.

On the other hand, when determining at step S2 that the manipulation is a key input manipulation, the CPU 50 performs settings in accordance with the manipulation code supplied from the key input device 1 by this key input manipulation (step S4). After the completion of step S4, the CPU 50 stores the manipulation code corresponding to the key input manipulation as described above in the key input manipulation log memory 32 (step S5).

Next, the CPU 50 searches for the same manipulation code as a manipulation code corresponding to the key input manipulation from the audio manipulation log memory 43 (step S26). Next, the CPU 50 determines whether or not the audio manipulation log memory 43 contains the same manipulation code as the manipulation code resulting from the key input manipulation (step S27). When determining at step S27 that the audio manipulation log memory 43 contains the same manipulation code, the CPU 50 determines from the date/time information stored corresponding to the manipulation code whether or not the manipulation code has been stored from the past three months or more (step S28). When determining at step S28 that the manipulation code has been stored before three months or more, the CPU 50 performs a processing operation by the audio manipulation information generation processing unit 33 (step S6). Specifically, the CPU 50 first reads the most recent manipulation code and each of manipulation codes stored preceding thereto from the key input manipulation log memory 32. Next, the CPU 50 determines whether or not a combination of the most recent manipulation code and each of the preceding manipulation codes exists in the second memory region of the audio manipulation phrase data memory 30 as shown in FIG. 3. When determining here that the combination exists, the CPU 50 reads audio manipulation phrase data corresponding to the combination of manipulation codes from the second memory region of the audio manipulation phrase data memory 30 as shown in FIG. 3. On the other hand, when determining that the combination of the most recent manipulation code and each of the preceding manipulation codes does not exist in the second memory region of the audio manipulation phrase data memory 30, the CPU 50 reads audio manipulation phrase data corresponding to the most recent manipulation code from the first memory region of the audio manipulation phrase data memory 30 as shown in FIG. 2. Even when determining at step S27 that the audio manipulation log memory 43 does not contain the same manipulation code as the manipulation code resulting from the key input manipulation, the CPU 50 executes step S6. After execution of step S6, the CPU 50 supplies the audio/visual output control circuit 4 with an audio manipulation phrase indicated by the audio manipulation phrase data read at step S6 for visual and audible outputs (step S7).

After the execution of step S7, or when determining at step S28 that the manipulation code has been stored within the past three months, the CPU 50 returns to the execution of step S1 to repeatedly execute the operations as described above.

Thus, according to the manipulation execution flow illustrated in FIG. 8, for a manipulation item for which the user has experienced an audio manipulation in the past three months, steps S6 and S7 are not executed even if a key input manipulation is performed to prompt the same manipulation as that manipulation, so that no audio manipulation phrase is presented. In other words, for a manipulation item which has been used by the user at a relatively recent time (for example, within the past three months), it is determined that the user has reached a high level of learning, purposely preventing the presentation of an audio manipulation phrase associated therewith.

In this way, according to the manipulation execution flow illustrated in FIG. 8, it is automatically determined in accordance with a learning level of the user whether an audio manipulation phrase is presented or not, so that the user is released from the annoyance that a known audio manipulation phrase is frequently presented.

For utilizing the audio manipulation function as described above, the user is required to speak previously registered audio manipulation phrases. In this respect, when the user speaks an unregistered phrase, the user may be audibly or visually notified that the audio manipulation function cannot be utilized with that phrase.

When a sequence of key input manipulations performed by the user may be realized through a key input manipulation other than that, the user may be audibly or visually notified to that effect.

As described above, the in-vehicle navigation system according to the present invention, in response to a manual input manipulation from the user, audibly or visually displays an audio manipulation phrase which is used when the manipulation is performed through an audio manipulation. Thus, the user can know a required audio manipulation phrase without previously memorizing registered audio manipulation phrases, so that a burden on the user is reduced for utilizing the audio manipulation function.

This application is based on Japanese Patent Application No. 2000-245864 which is hereby incorporated by reference.

What is claimed is:

1. A navigation system having a manipulation setting part for performing settings in accordance with a manual input manipulation or an audio input manipulation, comprising:

an audio manipulation information generator responsive to said manual input manipulation for generating audio manipulation phrase data indicative of an audio manipulation phrase for causing the same function as said manual input manipulation; and an audio manipulation phrase presentation unit for presenting said audio manipulation phrase indicated by said audio manipulation phrase data, thereby presenting said audio manipulation phrase upon receipt of said manual input manipulation.

2. A navigation system according to claim 1, further comprising:

an audio manipulation phrase data memory for previously storing said audio manipulation phrase data;

wherein said audio manipulation information generator generates said audio manipulation phrase data by reading said audio manipulation phrase data for causing the same function as said manual input manipulation from said audio manipulation phrase data memory in response to said manual input manipulation.

3. A navigation system according to claim 1, wherein said audio manipulation phrase presentation unit audibly or visually presents said audio manipulation phrase indicated by audio manipulation phrase data.

4. A navigation system according to claim 1, wherein when a predetermined sequence of said manual input manipulations is performed, said audio manipulation information generator generates said audio manipulation phrase data which causes the same function as a function eventually accomplished by said sequence of said manual input manipulations.

5. A navigation system according to claim 1, further comprising an audio manipulation phrase presentation requesting unit for requesting said audio manipulation phrase presentation unit to present said audio manipulation phrase only when a request is made for presenting said audio manipulation phrase through said manual input manipulation or said audio input manipulation.

6. A navigation system according to claim 1, further comprising:

a presentation mode register for storing a presentation mode indicating whether or not said audio manipulation phrase presentation unit presents said audio manipulation phrase;

a presentation mode setting unit for setting said presentation mode in said presentation mode register through said manual input manipulation or said audio input manipulation; and an audio manipulation phrase presentation controller for instructing said audio manipulation phrase presentation unit to present said audio manipulation phrase when said presentation mode set in said presentation mode register is a mode for causing presentation of said audio manipulation phrase, and for instructing said audio manipulation phrase presentation unit to stop presenting said audio manipulation phrase when said presentation mode is a mode for prohibiting presentation of said audio manipulation phrase.

7. A navigation system according to claim 1, wherein one audio manipulation phrase is presented in response to one input manipulation.

8. A navigation system having a manipulation setting part for performing settings in accordance with a input manipulation or an audio input manipulation, comprising;

audio manipulation information generator responsive to said manual input manipulation for generating audio manipulation phrase data indicative of an audio manipulation phrase for causing the same function as said manual input manipulation;

an audio manipulation phrase presentation unit for presenting said audio manipulation phrase indicated by said audio manipulation phrase data, thereby presenting said audio manipulation phrase upon receipt of said manual input manipulation;

an audio manipulation log memory for storing, each time said audio input manipulation is performed, said audio input manipulation in correspondence with date and time at which said audio input manipulation is performed, and contents of said manipulation; and a part responsive to said manual input manipulation for searching for information indicative of the same manipulation as said manual input manipulation from said audio manipulation log memory and instructing said audio manipulation phrase presentation unit to stop presenting said audio manipulation phrase when said audio input manipulation is recently used or when said audio input manipulation was performed at date and time later than predetermined date and time.

9. A method for controlling a navigation system which performs settings in accordance with a manual input manipulation or an audio input manipulation, said method comprising:

generating audio manipulation phrase data in response to said manual input manipulation, said audio manipulation phrase data indicating an audio manipulation phrase for causing the same function as said manual input manipulation; and presenting said audio manipulation phrase indicated by said audio manipulation phrase data, thereby presenting said audio manipulation phrase upon receipt of said manual input manipulation.

* * * * *